No. 799,879. PATENTED SEPT. 19, 1905.
J. TAMMINGA.
PAINT POT.
APPLICATION FILED MAR. 16, 1905.

Witnesses
Inventor:
Jippe Tamminga

UNITED STATES PATENT OFFICE.

JIPPE TAMMINGA, OF CHICAGO, ILLINOIS.

PAINT-POT.

No. 799,879.  Specification of Letters Patent.  Patented Sept. 19, 1905.

Application filed March 16, 1905. Serial No. 250,490.

*To all whom it may concern:*

Be it known that I, JIPPE TAMMINGA, a citizen of the United States, residing at 1688 West North avenue, in the city of Chicago, county of Cook, and State of Illinois, have invented a new and useful Improvement in Paint-Pots, of which the following is a specification.

My invention relates to that class of paint-pots used by painters to hold the paint used by them while engaged in the work of painting.

The object of my invention is to improve the construction and usefulness of paint-pots in common use.

The manner in which I accomplish my object is described in the following specification and illustrated in the accompanying drawings, in which—

Figure 1:
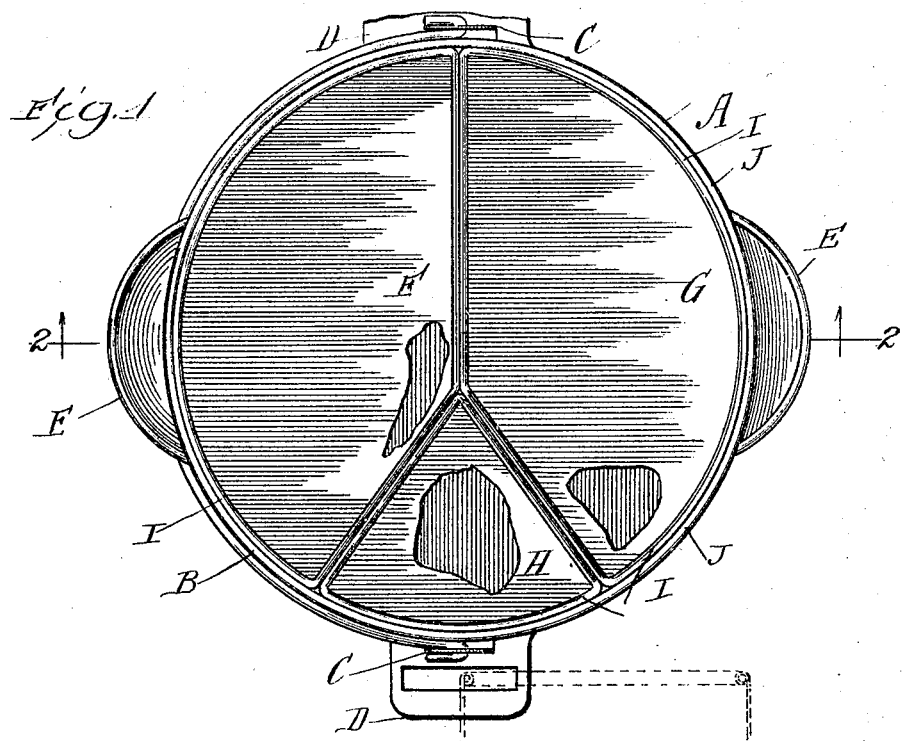
Figure 2:
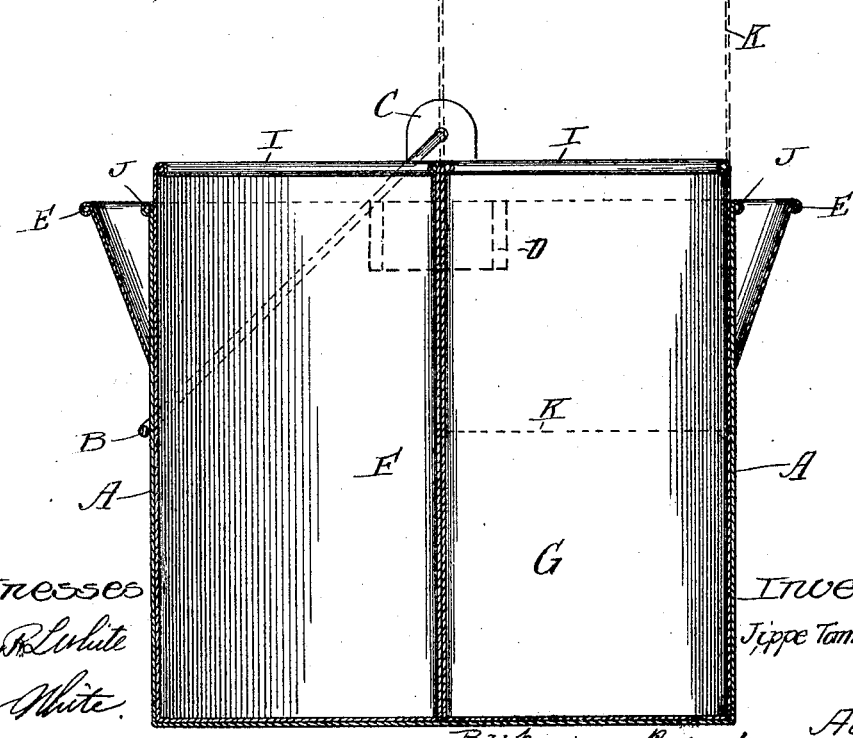

Figure 1 is a top plan view looking down into the pot. Fig. 2 is a central vertical sectional view through the line 2 2, Fig. 1.

The main body A of the pot is made of any suitable size and is provided with a bail B, attached in the ordinary manner to the ears C. Underneath each of the ears C is a holder D, adapted to receive and hold a putty-knife or other small tool.

On each side of the pot is a pocket E, adapted to hold putty and small articles used by painters.

Within the pot are three removable compartments F, G, and H. These compartments are adapted in shape to fit against each other and against the interior of the body A and to rest on the bottom of the pot. The tops I of each of these pots extend above the top J of the pot, so that they may be grasped by the thumb and fingers and be thereby lifted out of the body A. The dotted lines K represent the position of one of the compartments lifted part way out of the body A.

What I claim as new, and desire to secure by Letters Patent, is—

A combination paint-pot consisting of a main body A having a bail B, pockets E, tool-holders D, and removable compartments F, G, H; the tops I of said compartments extending above the top J of said main body, substantially as described and for the purposes specified.

JIPPE TAMMINGA.

Witnesses:
 JOSEPH STAAB,
 THOMAS J. MORGAN.